United States Patent
Fischer et al.

(10) Patent No.: US 7,558,317 B2
(45) Date of Patent: Jul. 7, 2009

(54) EDGE CALIBRATION FOR SYNCHRONOUS DATA TRANSFER BETWEEN CLOCK DOMAINS

(75) Inventors: Timothy C. Fischer, Firestone, CO (US); Samuel Naffziger, Fort Collins, CO (US); Benjamin J. Patella, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 550 days.

(21) Appl. No.: 11/118,740

(22) Filed: Apr. 29, 2005

(65) Prior Publication Data

US 2006/0244642 A1  Nov. 2, 2006

(51) Int. Cl.
*H04B 3/46* (2006.01)

(52) U.S. Cl. .................. 375/226; 375/219; 375/293; 375/354; 375/355; 375/356

(58) Field of Classification Search .............. 375/226, 375/293, 354–357, 369, 371, 374–375, 227.354, 375/219, 224; 713/300, 400–401; 370/401, 370/402, 503, 545
See application file for complete search history.

(56) References Cited

U.S. PATENT DOCUMENTS

| | | | |
|---|---|---|---|
| 5,487,095 A | 1/1996 | Jordan et al. | |
| 6,549,596 B1 | 4/2003 | Cretti et al. | |
| 6,574,380 B2 | 6/2003 | Ranalli | |
| 6,898,682 B2 | 5/2005 | Welker et al. | |
| 7,110,423 B1 | 9/2006 | Sethuram et al. | |
| 7,333,516 B1* | 2/2008 | Sikkink et al. | 370/503 |
| 7,436,917 B2* | 10/2008 | Adkisson et al. | 375/354 |
| 2003/0123588 A1* | 7/2003 | Parikh | 375/354 |
| 2004/0044919 A1 | 3/2004 | Dabral | |
| 2004/0062137 A1 | 4/2004 | Phan et al. | |
| 2004/0202179 A1* | 10/2004 | Tan et al. | 370/395.1 |
| 2004/0225977 A1* | 11/2004 | Akkerman | 716/6 |
| 2004/0243869 A1* | 12/2004 | Sharma et al. | 713/400 |
| 2005/0268265 A1* | 12/2005 | Ly et al. | 716/6 |
| 2005/0286507 A1 | 12/2005 | Sterling et al. | |
| 2006/0020843 A1 | 1/2006 | Frodsham et al. | |
| 2006/0091912 A1* | 5/2006 | Ghosh et al. | 326/93 |
| 2006/0236180 A1 | 10/2006 | Ong | |
| 2007/0009066 A1* | 1/2007 | Fredriksson | 375/326 |
| 2007/0255919 A1* | 11/2007 | Ware et al. | 711/167 |
| 2008/0004831 A1* | 1/2008 | Li | 702/119 |

OTHER PUBLICATIONS

Notice of Allowance from related case, U.S. Appl. No. 11/118,600 for "Count Calibration For Synchronous Data Transfer Between Clock Domains" filed Apr. 29, 2005.
Notice of Allowance from related case, U.S. Appl. No. 11/118,600 for "Count Calibration For Synchronous Data Transfer Between Clock Domains" filed Apr. 29. 2005.

* cited by examiner

*Primary Examiner*—Shuwang Liu
*Assistant Examiner*—Hirdepal Singh (57) ABSTRACT

Systems and methods of edge calibration for synchronous data transfer between clock domains are disclosed. An exemplary method may comprise comparing a drive clock signal to a receive clock signal, generating a select clock signal, and configuring a data path based a least in part on the select clock signal for synchronous data transfer between clock domains so that data arrives in an early clock domain at the desired logical clock cycle.

28 Claims, 9 Drawing Sheets

EDGE CALIBRATION FOR SYNCHRONOUS DATA TRANSFER BETWEEN CLOCK DOMAINS

RELATED APPLICATIONS

This application contains subject matter related to co-owned U.S. Patent Application for "Configurable Data Path For Synchronous Data Transfer Between Clock Domains" of Fischer, et al. Ser. No. 11/118,632, and co-owned U.S. Patent Application for "Count Calibration For Synchronous Data Transfer Between Clock Domains" of Fischer, et al. Ser. No. 11/118,600, each filed on the same day and hereby incorporated herein for all that is disclosed.

TECHNICAL FIELD

The described subject matter relates to synchronous data transfer, and more particularly to edge calibration for synchronous data transfer between clock domains.

BACKGROUND

Synchronous digital circuits (e.g., microprocessors) use internal clock signals to control operation sequences and timing of events. Some digital systems implement multiple clock domains in which the clock frequency in each domain is the same and skew within each domain is tightly controlled. However, skew between clock domains may negatively impact setup and hold constraints, resulting in non-determinism for signals crossing between domains. This skew between clock domains is magnified at higher frequencies.

Although asynchronous circuit design may be implemented where the magnitude of skew between clock domains is not known or cannot be held within acceptable bounds, synchronous circuit design is generally preferred for enhanced performance, deterministic data transfer, and more predictable behavior. Synchronous circuit designs typically employ a delay line, commonly referred to as a "salmon ladder," to transfer data synchronously between clock domains. The delay line includes delay components which match the source clock on one end of the delay line and increase in increments to match the sink clock on the other end of the delay line.

Delay lines, however, are typically matched to the source and sink clocks during design and do not account for various processing speeds, supply voltage effects, temperature effects, and frequency conditions during operation. In addition, the delay line may be constructed with different types of metal, field-effect transistors (FETs), and/or resistor-capacitor (R-C) components from what is used in the actual signal path. Any one or more of these factors may result in non-determinism, even in synchronous circuit designs which implement delay lines.

DETAILED DESCRIPTION

Systems and methods described herein may be implemented in a configurable data path for synchronous data transfer between clock domains. Exemplary embodiments may include a digitally-controlled data path which is configurable or adaptable for actual operating conditions. The data path handles data transfers between clock domains and provides deterministic data transfers between clock domains with sufficient margin to handle voltage and temperature variation across the operating range.

Briefly, the data path may be calibrated by measuring alignment between the source clock edge and the sink clock edge during run-time, allowing a setup/hold margin for the transfer to be determined and increased on a dynamic (or "as-needed") basis to cover circuit delay variation caused by voltage and temperature effects on the circuit. The calibration may then be used to configure the clocking and cyclic latency for a data path and configure clocks and multiplexer selects for the data path to implement deterministic transfers between the clock domains.

Exemplary embodiments shown and described herein specify a delay line from the late clock domain to the early clock domain. However, it is noted that in other exemplary embodiments, the delay line may be implemented from the early clock domain to the late clock domain.

It is also noted that operations described herein may be implemented in logic circuitry. Exemplary logic circuitry is shown and described herein for purposes of illustration. However, the exemplary logic circuitry is not intended to be limiting. Other embodiments, including software implementations, will also be readily apparent to those having ordinary skill in the art after having become familiar with the teachings herein.

Exemplary System

Figure 1:
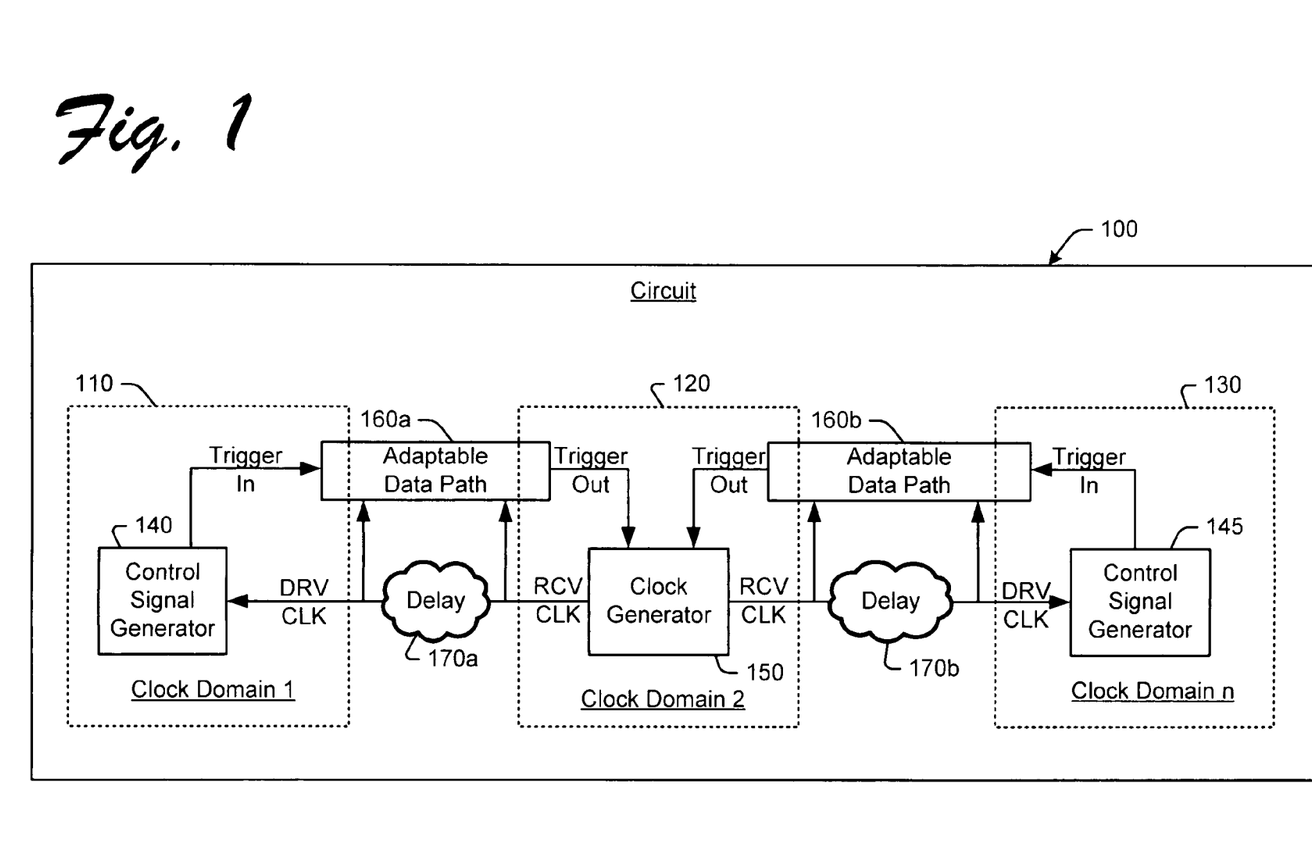
FIG. 1 is a high-level illustration of an exemplary circuit having a plurality of clock domains.

FIG. 1 is a high-level illustration of an exemplary circuit having a plurality of clock domains. Exemplary circuit 100 may be a circuit under test (or "test circuit"), such as, e.g., a microprocessor requiring deterministic cross-domain data transfers. For purposes of illustration, test circuit 100 is shown having a first clock domain 110, a second clock domain 120, and an $n^{th}$ clock domain 130. It is noted that circuits may have any number of clock domains, and the systems and methods described herein are not limited to use with circuits having any particular number of clock domains. Test circuit 100 may also include one or more control signal generator 140, 145, e.g., for generating control signals (or "trigger" signals) for test operations.

In an exemplary test operation, a clock generator 150 for the test circuit 100 may need to be stopped on a specific logical cycle, independent of frequency. For example, the clock generator 150 may need to be stopped for a serial scan of the test circuit data registers to troubleshoot a floating point error. Accordingly, control signal generator 140, 145 may issue a clock-stop signal to the clock generator 150.

The clock-stop signal may originate in a first clock domain (e.g., clock domain 110) where the control signal generator 140, 145 resides. However, the first (or "late") clock domain may be offset from a second (or "early") clock domain (e.g., clock domain 120) where the clock generator 150 resides, as illustrated by delay 170a,b. Because the clock generator operates over a wide range of frequencies, these clock-stop signals cross between clock domains with high frequency dependent skew components.

For purposes of illustration, the late clock domain (e.g., clock domain 110) may be at logical clock cycle 3000 when the early clock domain (e.g., clock domain 120) is at logical clock cycle 3004. Therefore, a control signal generated in the late clock domain takes no less than four logical clock cycles to arrive in the early clock domain (i.e., 3004−3000=4). Accordingly, an event generated in the late clock domain needs to be delayed by four logical clock cycles before being issued to the early clock domain so that data arrives in the early clock domain at the desired logical clock cycle.

In exemplary embodiments, the control signal may be issued from the late clock domain to the early clock domain via one or more adaptable (or configurable) data path 160a, b so that each clock domain receives the event (e.g., stop-clock signal) at the desired clock cycle. For example, the adaptable data path 160a, 160b may measure the difference in logical clock cycles between a receive clock (RCV CLK) signal issued by the clock generator 150, and a drive clock (DRV CLK) signal including the delay 170a between clock cycles. The adaptable data path 160a, 160b uses this measurement to adjust the control signal (or trigger-in signal) so that the control signal (or trigger-out signal) that is delivered to the early clock domain includes data (e.g., a stop-clock instruction on the desired logical clock cycle.

Before continuing, it is noted that the adaptable data path 160a, 160b adjusts for significant delay between clock domains (illustrated at 170a, 170b). Any delay between the data path 160a, 160b and the clock generator 150 is considered to be negligible, and therefore does not violate setup and hold times.

Figure 2:
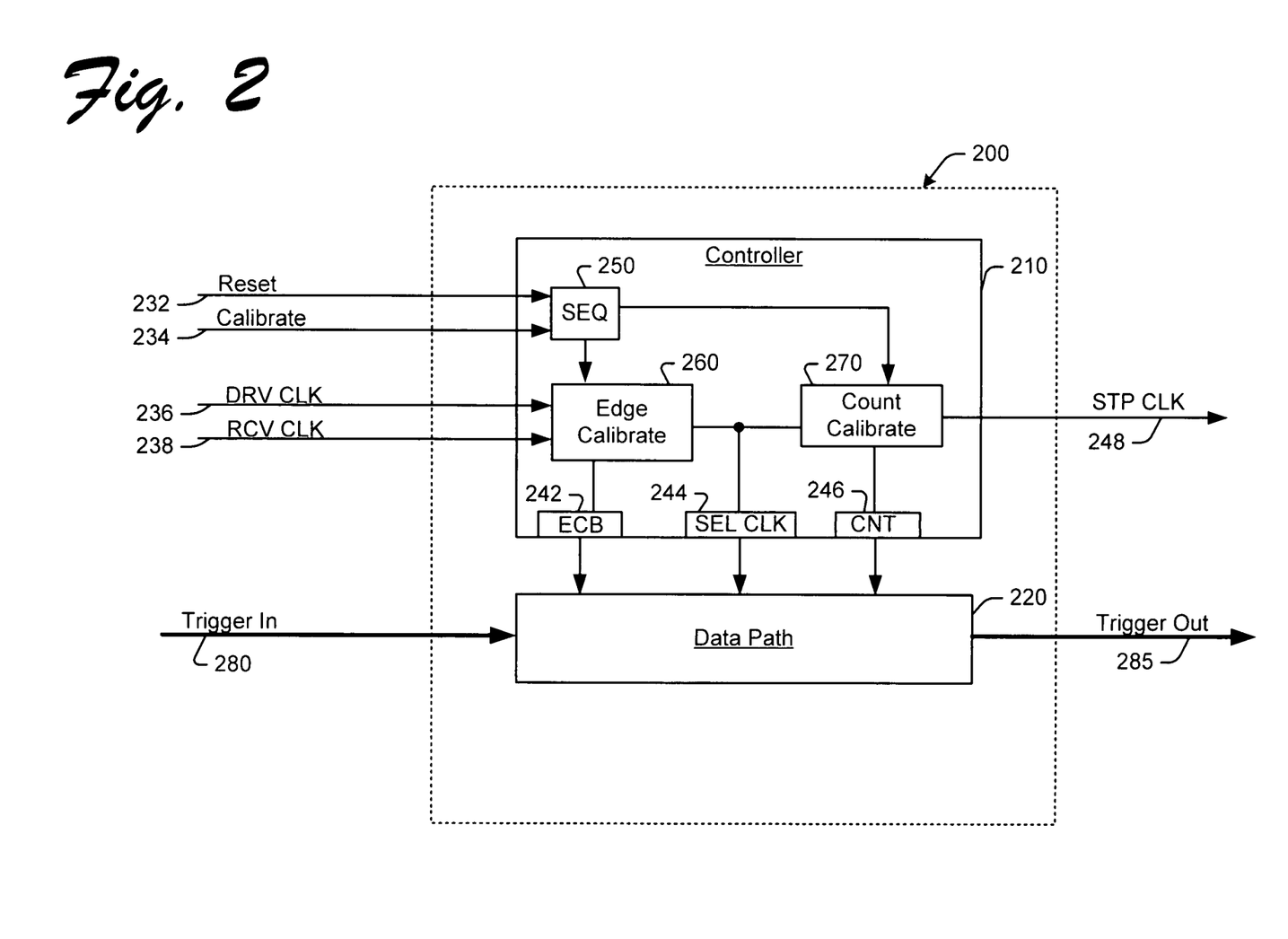
FIG. 2 is a functional block diagram of an exemplary system for synchronous data transfer between clock domains.

FIG. 2 is a functional block diagram of an exemplary system (such as adaptable data path 160a, 160b in FIG. 1) for synchronous data transfer between clock domains. Exemplary system 200 may include a controller 210 operatively associated with a data path 220. Controller 210 may be implemented to configure the data path 220 based on the latency between clock domains (e.g., clock domains 110-130 in FIG. 1) at run-time.

In an exemplary embodiment, logic functions of controller 210 and data path 220 are implemented in logic circuitry, as described in more detail below with reference to FIG. 5. Controller 210 may include inputs for receiving a reset signal 232, a calibrate (CAL) signal 234, a drive clock (DRV CLK) signal 236, and a receive clock (RCV CLK) signal 238. Controller 210 may also include outputs for issuing an edge calibrate bypass (ECB) signal 242, a select clock (SEL CLK) signal 244, a count (CNT) signal 246, and a stop clock (STP CLK) signal 248 to the data path 220.

In operation, reset signal 232 may be issued to system 200 to return it to a predictable logic state and/or clear any prior configurations, e.g., at start-up or for recalibration. A sequencer 250 in controller 210 first activates an edge calibration circuit 260, and then activates a count calibration circuit 270.

Edge calibration circuit 260 may issue a bypass signal 242 to route the trigger-in signal 280 around a delay line in the data path 220, as explained in more detail below. In addition, edge calibration circuit 260 may be operated to select partial cycle (e.g., quarter cycle) sink-domain clocks for maximizing setup and hold times for transfers between clock domains. This calibration also improves the data path's tolerance of voltage and temperature variation after calibration. In an exemplary implementation where quarter cycle sink-domain clocks are selected, the minimum margin for each constraint is a quarter cycle and is sufficient to cover the delay range of clock distribution across the maximum voltage and temperature operating region of this embodiment. However, other margins may also be implemented.

Edge calibration 260 may operate in conjunction with count calibration circuit 270 to determine latency between clock domains. In an exemplary embodiment, the controller 210 may determine the latency by measuring the difference or offset in logical clock cycles between the drive clock (DRV CLK) signal 236 and the receive clock (RCV CLK) signal 238. In an example where the receive clock (RCV CLK) signal is at logical clock cycle 304 and the drive clock (DRV CLK) signal is at logical clock cycle 300, the latency between clock domains is 4 logical clock cycles. That is, an event generated in the first (e.g., drive) clock domain takes 4 logical clock cycles to arrive in the second (e.g., receive) clock domain.

Controller 210 issues select clock (SEL CLK) signals 244 and count (CNT) signals 246 to the data path 220 for allocating a predetermined number of cycles (N) to transfer data. In an exemplary embodiment, N is greater than the maximum expected separation (M) between clock domains. Accordingly, controller 210 may configure data path 220 to occupy M minus N cycles of latency. For example, if M is selected to be 5 clock cycles, and there are 2 cycles of latency, the data path may be configured to increment the delay by 3 clock cycles (e.g., 5−2=3).

Edge calibration is described in more detail herein. Exemplary embodiments of data path and count calibration circuits are described in more detail in the related patent applications cross-noted above. For purposes of this application, it is sufficient to understand that the edge and count calibration is used by controller 210 to configure the clocking and cyclic latency for data path 220.

Before continuing it is noted that the data path 220 may be configured at run-time. Also that the data path 220 is configured based on operational data for the Also in exemplary embodiments, the data path configuration may be maintained during operation, as constant recalibration may be intrusive to operation of the circuit. However, the data path 220 is adaptable and may be reconfigured, e.g., based on changes in the run-time environment.

Figure 3:
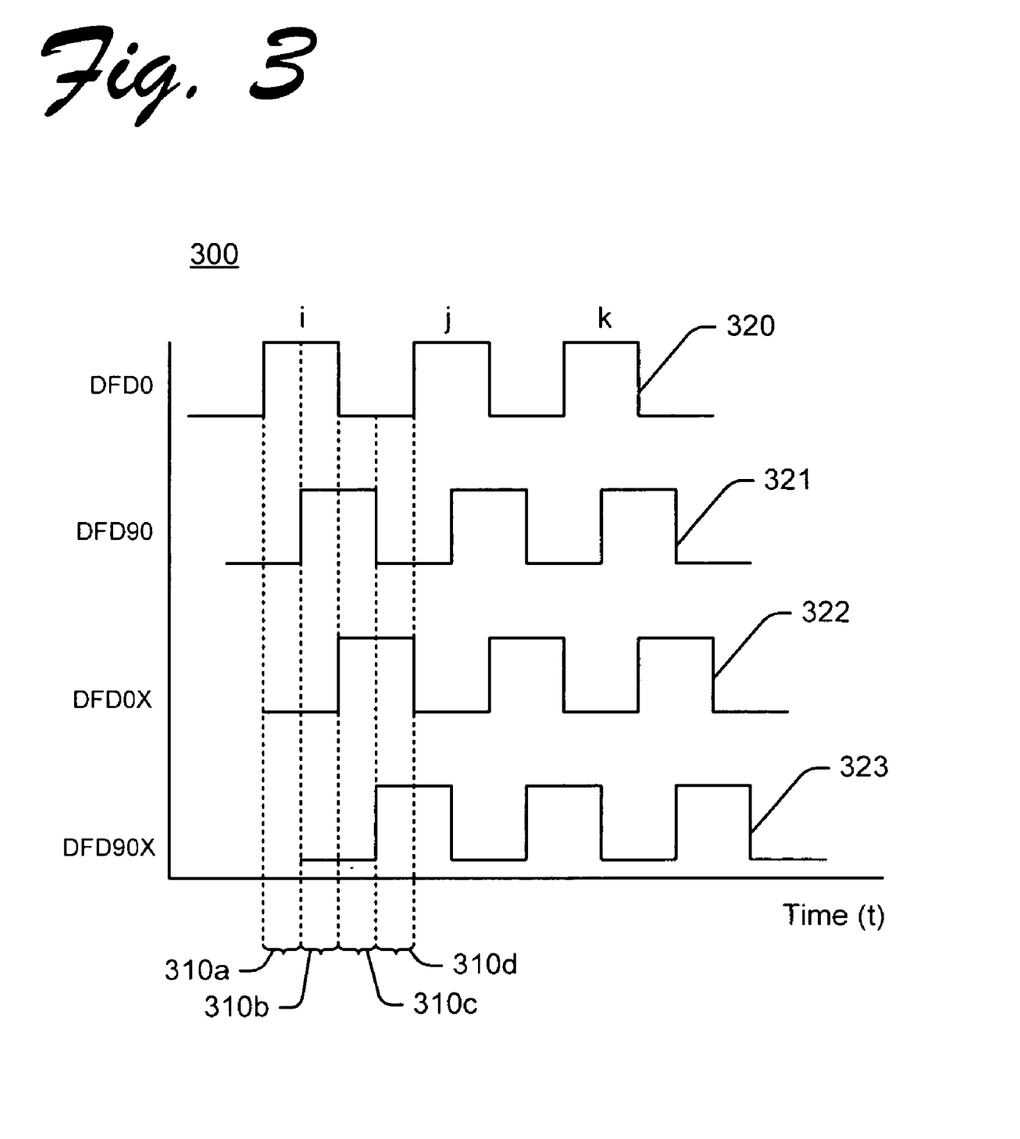
FIG. 3 is a waveform diagram illustrating exemplary clock calibration signals.

FIG. 3 is a waveform diagram illustrating exemplary clock calibration signals. Exemplary clock calibration signals 300 may be defined in discrete timing intervals 310a-d relative to one another (e.g., in quadrants). A drive clock signal (e.g., the drive clock signal 236 in FIG. 2) may be compared to the clock calibration signals and classified for edge calibration.

Four exemplary clock calibration signals 320-323 are shown in FIG. 3 for purposes of illustration, referred to as the DFD0 signal, the DFD90 signal, the DFD0X signal and the DFD90X signal. The DFD0 signal is also the receive clock signal (e.g., the receive clock signal 238 in FIG. 2). The other clock calibration signals are offset from the receive clock signal (or DFD0 signal) by a predetermined timing interval (e.g., timing intervals 310a-d). For example, the DFD90 signal 321 is offset from the DFD0 signal 320 by 90°, the DFD0X signal 322 is offset from the DFD0 signal 320 by 180°, and the DFD90X signal 323 is offset from the DFD0 signal 320 by 270°.

It is noted that the number of clock calibration signals 320-323 implemented for edge calibration is a matter of design choice. For example, clock calibration signals may be implemented over more timing intervals than the quadrants defined in FIG. 3, e.g., to increase granularity of the edge calibration. Alternatively, clock calibration signals may be implemented over fewer timing intervals, e.g., to increase processing speed for the edge calibration.

Clock calibration signals 320-323 may be implemented in the edge calibration circuitry to identify the timing interval for the leading edge of the drive clock signal. In an exemplary embodiment, the drive clock signal is compared to the clock calibration signals 320-323, as discussed in more detail below with reference to FIGS. 4a-d.

FIGS. 4a-d are exemplary waveform diagrams illustrating clock select for a drive clock signal. Exemplary clock calibration signals 400 (e.g., DFD0, DFD90, DFD0X, and DFD90X described above with reference to FIG. 3) are shown above each waveform diagram in FIGS. 4a-d for ready reference.

Figure 4A:
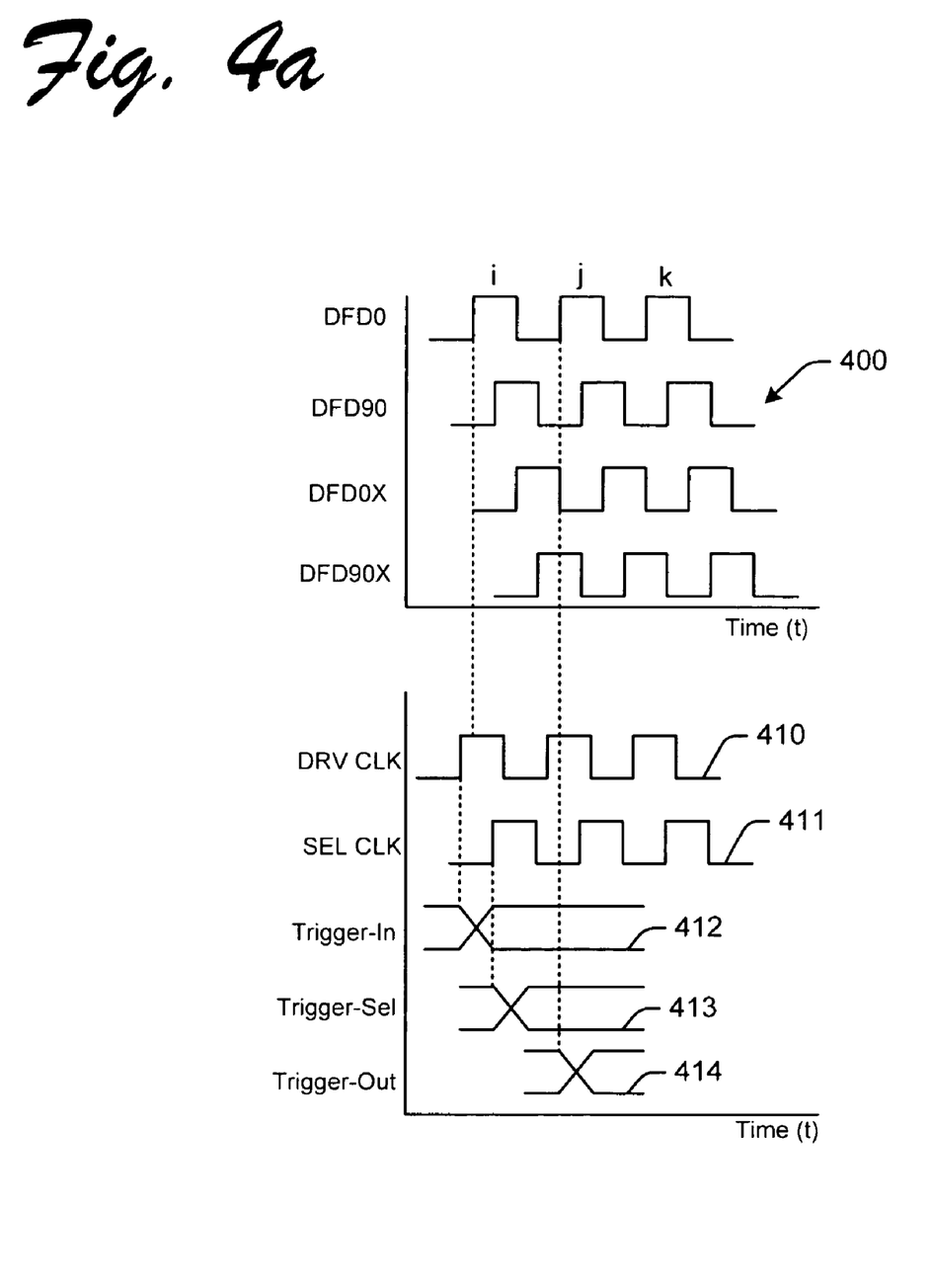
FIGS. 4a-d are exemplary waveform diagrams illustrating clock select for trigger-in signals.

In FIG. 4a, the leading edge of the drive clock signal 410 occurs prior to the leading edge of pulse i in the receive clock signal (i.e., the DFD0 signal). Accordingly, the DFD0 signal may be issued as the select clock signal (SEL CLK). However, temperature effects may cause variation in the clock cycles. Accordingly, a margin of error may be implemented in an exemplary embodiment to help ensure that data is transferred between clock domains and still meets hold time constraints. A margin of error of one timing interval is used for the example in FIG. 4a, and the DFD90 signal is issued as the select clock signal 411 to a count calibration circuit (e.g., the count calibration circuit 270 in FIG. 2) and a data path (e.g., the data path 220 in FIG. 2).

The select clock signal 411 issued to the data path (illustrated in FIG. 4a as trigger-select signal 413) causes the trigger-in signal 412 to latch at the rising edge of pulse j in the receive clock signal, as illustrated by the trigger-out signal 414 shown in FIG. 4a.

Before continuing, it is noted that any suitable margin of error may be implemented and is not limited to the quarter clock cycle shown in FIG. 4a. In another exemplary embodiment, a margin of error of multiple time intervals may be implemented. Alternatively, no margin of error need be implemented.

Figure 4B:
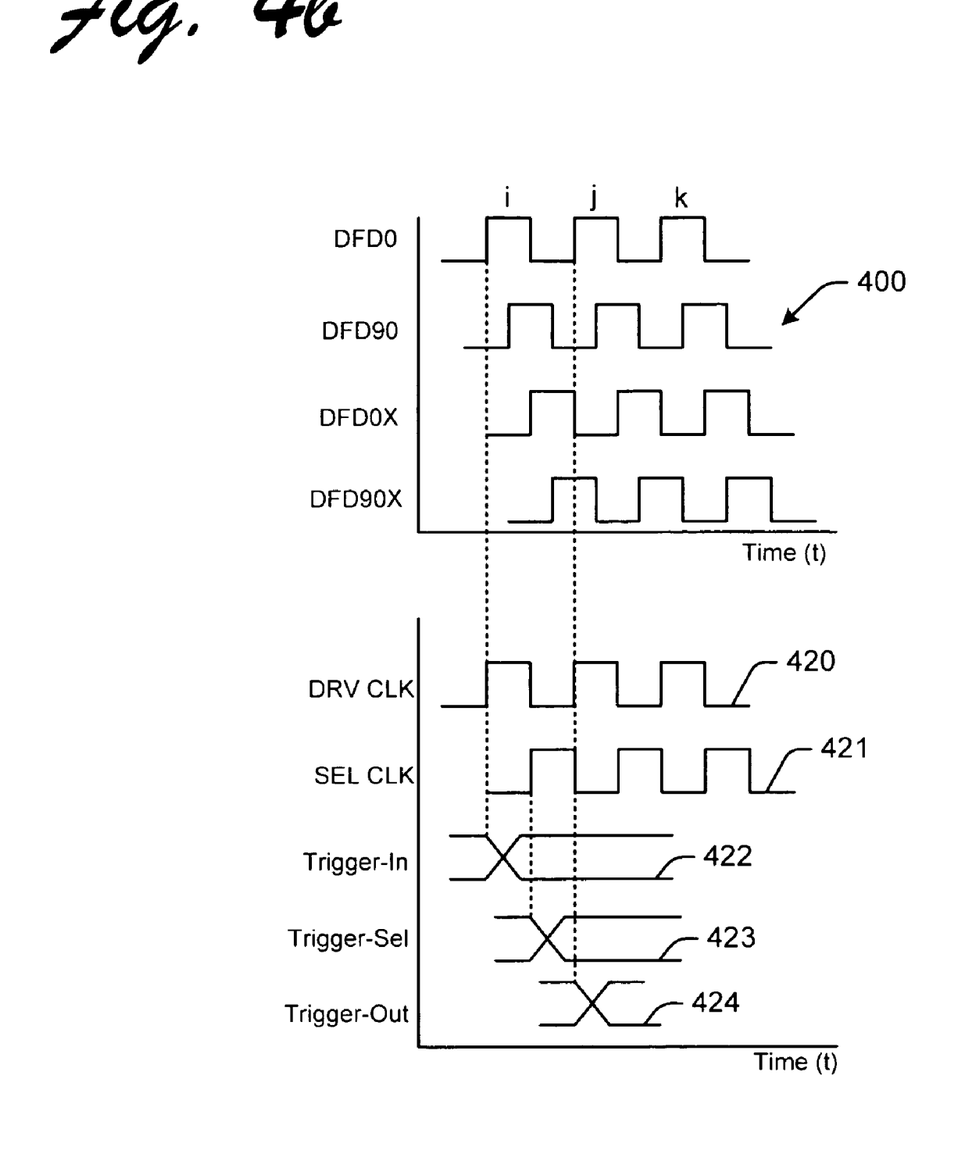

In FIG. 4b, arrival of the leading edge of the drive clock signal 420 coincides with arrival of the leading edge of pulse i in the receive clock signal (i.e., the DFD0 signal). Accordingly, the DFD90 signal may be issued as the select clock signal (SEL CLK). Again, however, a margin of error may be implemented in an exemplary embodiment to help ensure that data is transferred between clock domains and still meets hold time constraints even if temperature effects cause variation in the clock cycles. In FIG. 4b, the DFD0X signal is issued as the select clock signal 421 to the count calibration circuit (e.g., the count calibration circuit 270 in FIG. 2) and the data path (e.g., the data path 220 in FIG. 2).

The select clock signal 421 issued to the data path (illustrated in FIG. 4b as trigger-select signal 423) causes the trigger-in signal 422 to latch at the rising edge of pulse j in the receive clock signal, as illustrated by the trigger-out signal 424 shown in FIG. 4b.

Figure 4C:
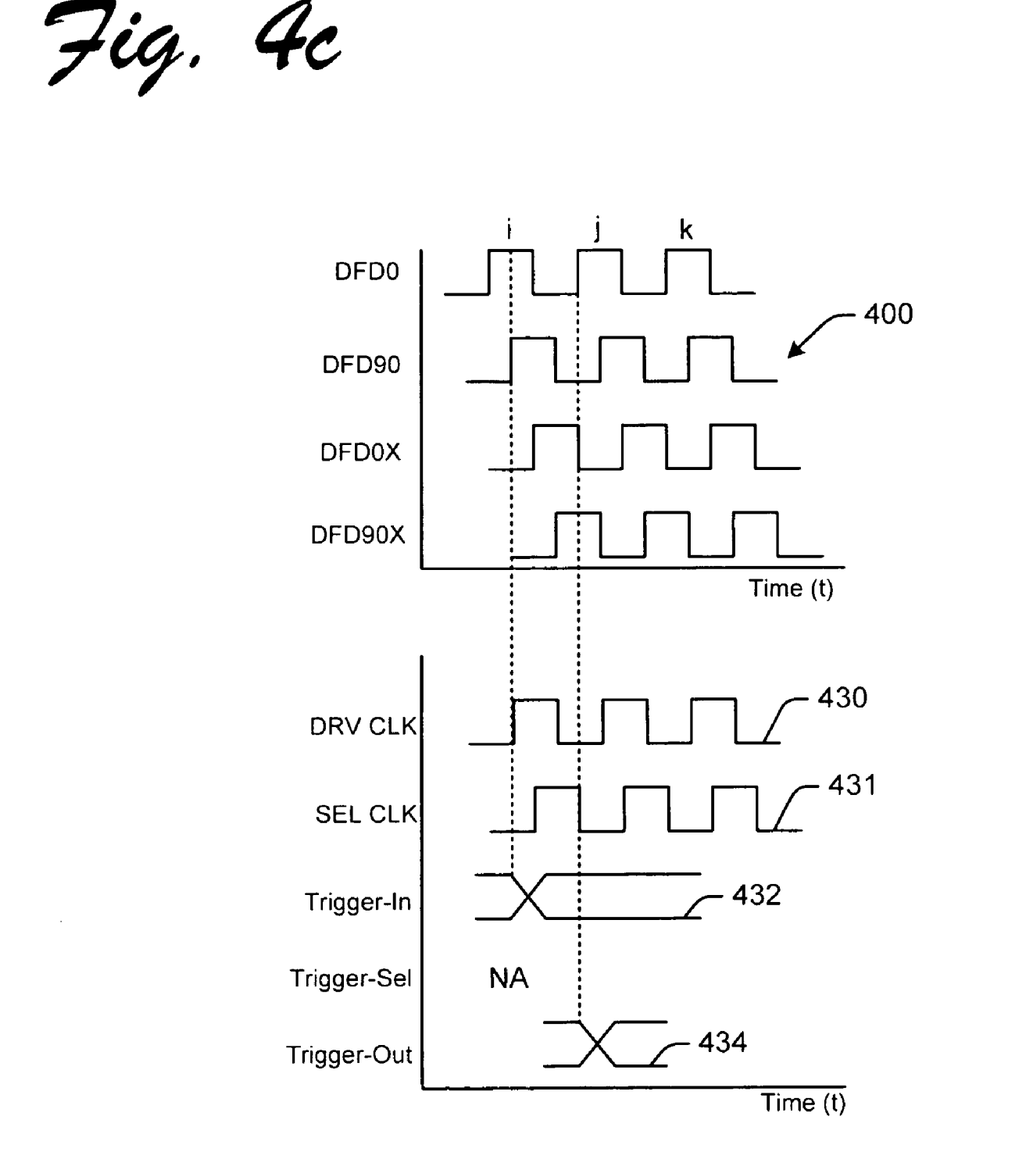

In FIG. 4c, the leading edge of the drive clock signal 430 arrives after the leading edge of pulse i in the receive clock signal (i.e., the DFD0 signal), and is coincident with the leading edge of the DFD90 signal. Accordingly, the DFD0X signal may be issued as the select clock signal (SEL CLK). Again, however, a margin of error may be implemented in an exemplary embodiment. In FIG. 4c, the DFD90X signal is issued as the select clock signal 431.

In this case, the select clock signal 431 is only issued to the count calibration circuit (e.g., count calibration circuit 270 in FIG. 2) so that both the edge calibration and count calibration circuits operate according to the same relation between the drive and receive clock domains.

Edge calibration circuit also issues a bypass signal (e.g. the bypass signal 242 in FIG. 2) to the data path. Bypass signal causes the trigger-in signal 432 to latch at the rising edge of pulse j in the receive clock, as illustrated by the trigger-out signal 434 shown in FIG. 4c.

Figure 4D:
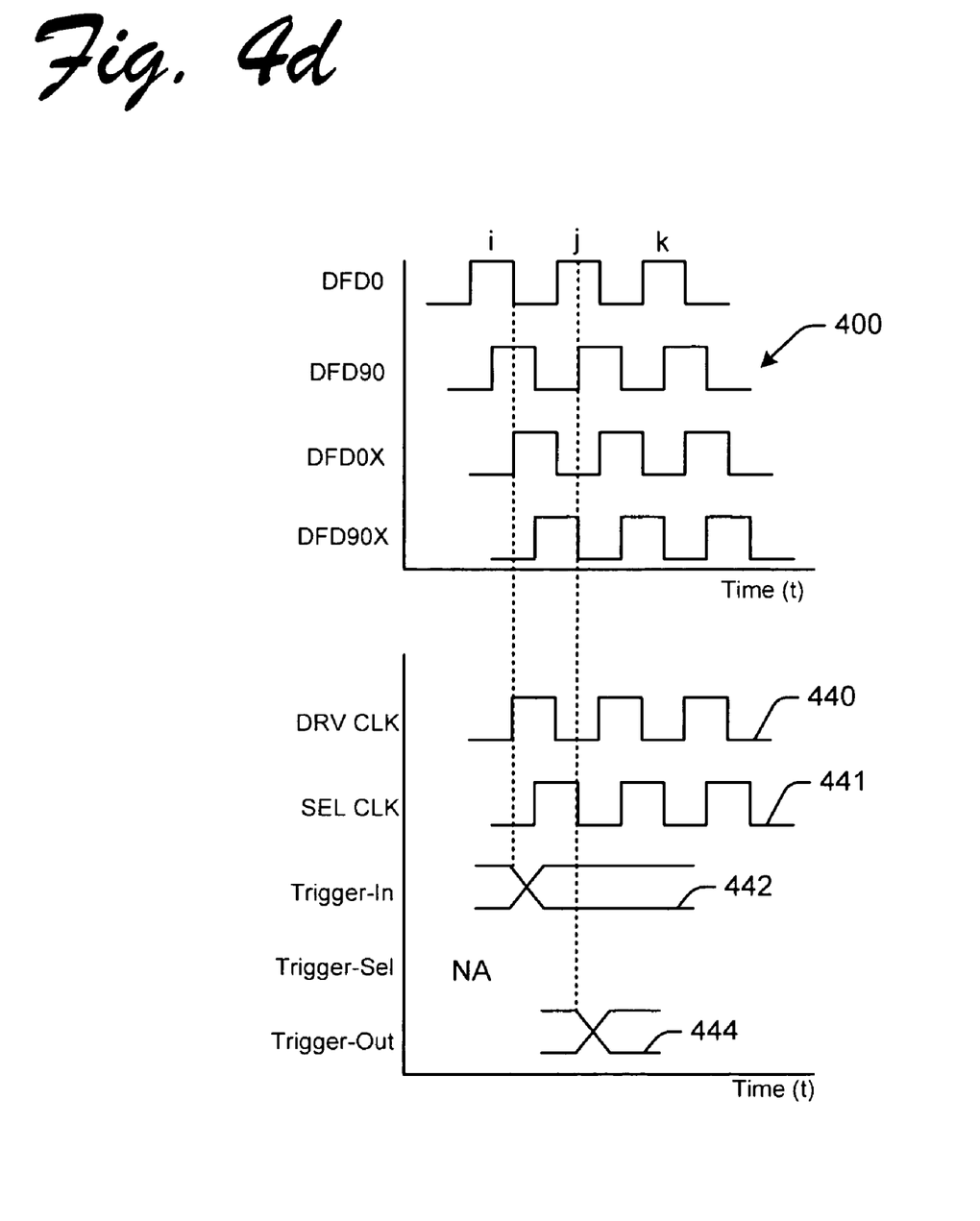

In FIG. 4d, the leading edge of the drive clock signal 440 arrives coincident with the falling edge of pulse i in the receive clock signal (i.e., the DFD0 signal), and is coincident with the leading edge of the DFD0X signal. Accordingly, the DFD90X signal may be issued as the select clock signal (SEL CLK). Again, however, a margin of error may be implemented in an exemplary embodiment. In FIG. 4d, the DFD0X signal is issued as the select clock signal 441.

In this case, again, the select clock signal 441 is only issued to the count calibration circuit (e.g., count calibration circuit 270 in FIG. 2) so that both the edge calibration and count calibration circuits operate according to the same relation between the drive and receive clock domains.

Edge calibration circuit also issues a bypass signal (e.g. the bypass signal 242 in FIG. 2) to the data path. Again, bypass signal causes the trigger-in signal 442 to latch at the rising edge of pulse j in the receive clock, as illustrated by the trigger-out signal 444 shown in FIG. 4d.

Figure 5:
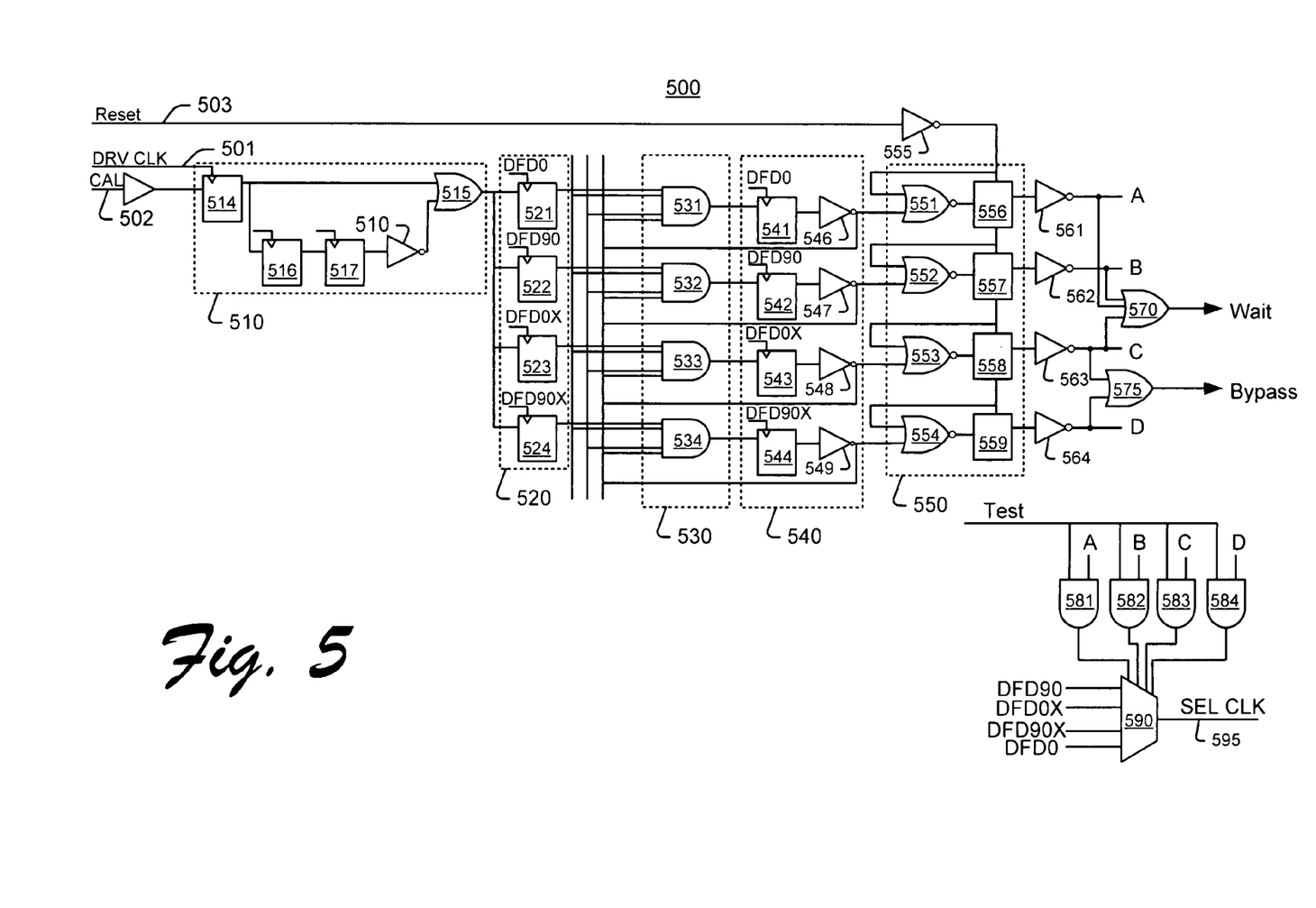
FIG. 5 is a schematic diagram illustrating an exemplary edge calibration circuit.

FIG. 5 is a schematic diagram illustrating an exemplary edge calibration circuit. Exemplary edge calibration circuit 500 may be implemented as a logic circuit. For example, edge calibration circuit 500 may include a number of semi-conductor components, such as, e.g., Complementary Metal-Oxide Semiconductor (CMOS) transistor devices. However, it is noted that the edge calibration circuit may also be implemented in other circuitry as will be readily apparent to one having ordinary skill in the art after becoming familiar with the teachings shown and described herein.

Exemplary edge calibration circuit 500 may receive a drive clock signal 501, calibrate signal 502, and reset signal 503. The drive clock signal 501 and calibrate signal 502 are issued to one-shot circuit 510. One-shot circuit 510 converts the drive clock signal into a 2-cycle wide pulse for input to sampling circuit 520.

In an exemplary embodiment, input to the one-shot circuit 510 is delivered via inverter 512 to latch 514. Latch 514 holds the signal until the next rising edge arrives. Output from latch 514 is then provided directly to one input on logical NOR gate 515, and via latches 516, 517 and inverter 518 to a second input on logical NOR gate 515 to hold the drive clock signal at a logical high until latch 517 goes high.

Sampling circuit 520 may include a plurality of latches 521-524. For example, a latch may be provided for input from each clock calibration signal in FIG. 5, latch 521 receives the DFD0 signal from the receive clock signal, latch 522 receives the DFD90 signal from the receive clock signal, latch 523 receives the DFD0X signal from the receive clock signal, and latch 523 receives the DFD90X signal from the receive clock signal (see, e.g., FIG. 3).

Sampling circuit 520 performs the comparison between the drive clock and the receive clock, illustrated by the waveform diagrams in FIGS. 4a-d. Whichever of the latches 521-524 fires first corresponds to the clock calibration signal for the drive clock signal (e.g., including a margin of error). Output from each of the other latches is blocked (or "locked out") by priority encoder circuit 530, including logical AND gates 531-534.

Edge calibration circuit 500 may optionally include a relatche circuit 540. Relatche circuit 540 may be implemented if the clock calibration signal cannot be readily determined (e.g., whether output from sampling circuit 520 is a logical 0 or a logical 1). Latches 541-544 and corresponding inverters 546-548 provide a delay with a feedback loop to hold the output until the signal can be resolved (e.g., as a logical 0 or logical 1).

Edge calibration circuit 500 may optionally include a hold calibration circuit 550. Hold calibration circuit 550 may be implemented as logical OR gates 551-554 and corresponding zero catcher latches 556-559 which maintain the calibration determined by the edge calibration circuit 500. That is, the edge calibration circuit 500 will continue to issue the same select clock signal until the edge calibration circuit 500 is reset. A reset signal 503 may be issued (e.g., via inverter 555) to release the calibration issued by edge calibration circuit 500.

The select clock signal may be issued via inverters 561-564 and multiplexer 590 over line 595 to a count calibration circuit (e.g., the count calibration circuit 270 in FIG. 2) and a data path (e.g., the data path 220 in FIG. 2) to configure the data path for synchronous data transfer between clock domains.

A logical OR gate 570 may be provided between the output of inverters 561, 562, 563 (output A, B, and C). When output from any of the inverters 561 OR 562 OR 563 is issued, a wait signal may also be issued to the count calibration circuit to correlate the edge calibration with the count calibration.

A logical OR gate 575 may also be provided between the output of inverters 563, 564 (output C and D). When either the output from inverter 563 corresponding to the DFD0X select clock signal, or output from inverter 564 corresponding to the DFD90X select clock signal is issued, a bypass signal is issued to the data path. See, e.g., FIGS. 4c and 4d.

It is noted that the systems and methods described herein do not need to be implemented in any particular circuit design. The circuit design described with reference to FIG. 5 is provided merely as exemplary of one embodiment of an edge calibration circuit. It is contemplated that those having ordinary skill in the art, after becoming familiar with the teachings herein, will be able to provide other circuit designs for implementing edge calibration for synchronous data transfer between clock domains.

Exemplary Operations

Figure 6:
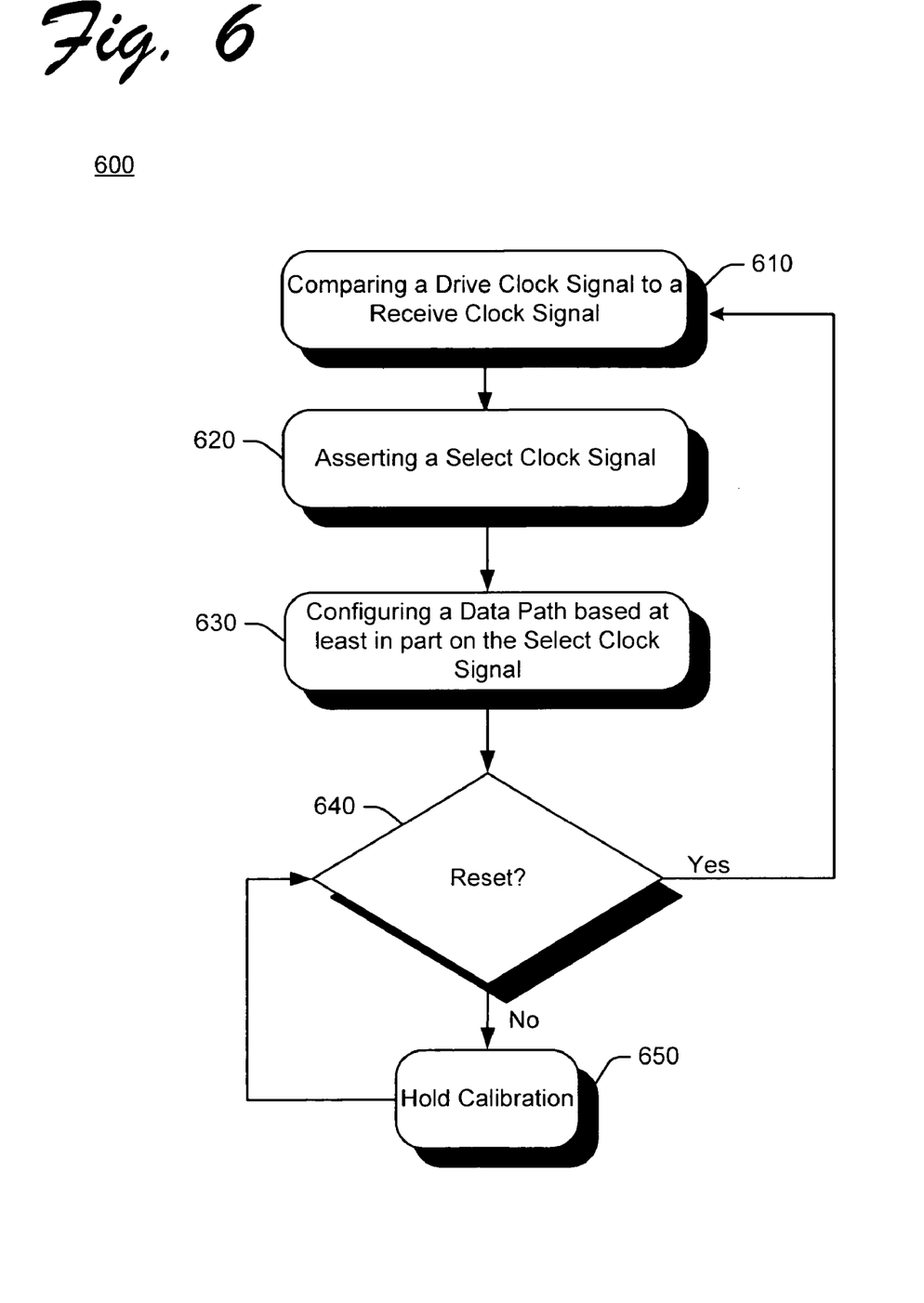
FIG. 6 is a flowchart illustrating exemplary operations to implement edge calibration for synchronous data transfer between clock domains.

FIG. 6 is a flowchart illustrating exemplary operations to implement edge calibration for synchronous data transfer between clock domains. As noted above, logic circuitry may be provided to execute operations 600. In an exemplary embodiment, the components and connections depicted in the figures may be used to implement synchronous data transfer between clock domains. It is also contemplated that in other embodiments, operations shown and described herein may be implemented as logic instructions (or software) for execution by a processor or processing units, e.g., for circuit modeling using computer devices.

In operation 610, a drive clock signal may be compared to a receive clock signal. In operation 620, a select clock signal may be generated. For example, the select clock signal may be based on the compared drive clock and receive clock signals as described in an exemplary embodiment in FIGS. 4 a -d, above. In operation 630, a data path may be configured based at least in part on the select clock signal (e.g., generated in operation 620).

Optionally, a determination may be made in operation 640 whether to reset edge calibration. If a reset signal is issued, operations may return to operation 610. Alternatively, edge calibration may be maintained in operation 650 until a reset signal is received (e.g., in operation 640).

The operations shown and described herein are provided to illustrate exemplary implementations of edge calibration for synchronous data transfer between clock domains. Still other operations may also be implemented to enable edge calibration for synchronous data transfer between clock domains.

In addition to the specific embodiments explicitly set forth herein, other aspects will be apparent to those skilled in the art from consideration of the specification disclosed herein. It is intended that the specification and illustrated embodiments be considered as examples only, with a true scope and spirit of the following claims.

The invention claimed is:

1. A system, comprising:
a controller for coupling to a test circuit to receive a drive clock signal and a receive clock signal,
an edge calibration circuit for comparing logical clock cycles on the drive clock signal with logical clock cycles on the receive clock signal and generating a select clock signal based on the comparison; and
a data path configurable based at least in part on the select clock signal to synchronize input from a first clock domain of the test circuit with output in a second clock domain of the test circuit so that data arrives in an early clock domain at the desired logical clock cycle, wherein the edge calibration circuit issues a bypass signal to the data path if the leading edge of the drive clock signal arrives at least half way through a first pulse of the receive clock signal.

2. The system of claim 1 wherein the edge calibration circuit includes a one-shot circuit to convert the drive clock signal into a two-cycle wide pulse for comparison with the receive clock signal.

3. The system of claim 1 wherein the edge calibration circuit includes a sampling circuit to compare the drive clock signal with the receive clock signal.

4. The system of claim 3 wherein the edge calibration circuit includes a priority encoder circuit to block output from the sampling circuit after the drive clock signal is compared with the receive clock signal.

5. The system of claim 3 wherein the edge calibration circuit includes a delay and feedback circuit to resolve output from the sampling circuit 6. The system of claim 1 wherein the edge calibration circuit includes a hold calibration circuit.

7. The system claim 1 wherein the edge calibration circuit issues a bypass signal to the data path if the leading edge of the drive clock signal is aligned with the falling edge of the receive dock signal.

8. The system of claim 1 wherein the receive clock signal includes a plurality of clock calibration signals for competing the drive clock signal and receive clock signal.

9. The system of claim 1 wherein the data path aligns a trigger-in signal with a predetermined pulse in the receive clock signal based at least in part on the select clock signal.

10. The system of claim 1 wherein the select clock signal includes a margin of error for temperature effects.

11. A system, comprising:
a controller for coupling to a test circuit to receive a drive clock signal and a receive clock signal;
an edge calibration circuit for comparing logical clock cycles on the drive clock signal with logical clock cycles on the receive clock signal and generating a select clock signal based on the comparison, the edge calibration circuit including:
a sampling circuit to compare the drive clock signal with the receive clock signal; and a priority encoder circuit to block output from the sampling circuit after the drive clock signal is compared with the receive clock signal; and a data path configurable based at least in part on the select clock signal to synchronize input from a first clock domain of the test circuit with output in a second clock domain of the test circuit so that data arrives in an early clock domain at the desired logical clock cycle.

12. The system of claim 11 wherein the edge calibration circuit includes a one-shot circuit to convert the drive clock signal into a two-cycle wide pulse for comparison with the receive clock signal.

13. The system of claim 11 wherein the edge calibration circuit includes a delay and feedback circuit to resolve output from the sampling circuit.

14. The system of claim 11 wherein the edge calibration circuit includes a hold calibration circuit.

15. The system of claim 11 wherein the edge calibration circuit issues a bypass signal to the data path if the leading edge of the drive clock signal arrives at least halfway through a first pulse of the receive clock signal.

16. The system of claim 11 wherein the edge calibration circuit issues a bypass signal to the data path if the leading edge of the drive clock signal is aligned with the falling edge of the receive clock signal.

17. The system of claim 11 wherein the receive clock signal includes a plurality of clock calibration signals for comparing the drive clock signal and receive clock signal.

18. The system of claim 11 wherein the data path aligns a trigger-in signal with a predetermined pulse in the receive clock signal based at least in part on the select clock signal.

19. The system of claim 11 wherein the select clock signal includes a margin of error for temperature effects.

20. A system, comprising;
a controller for coupling to a test circuit to receive a drive clock signal and a receive clock signal;
an edge calibration circuit for comparing logical clock cycles on the drive clock signal with logical clock cycles on the receive clock signal and generating a select clock signal based on the comparison, the edge calibration circuit including:
a sampling circuit to compare the drive clock signal with the receive clock signal; and
a delay and feedback circuit to hold the output, until it is resolved as a logic signal, from the sampling circuit; and
a data path configurable based at least in part on the select clock signal to synchronize input from a first clock domain of the test circuit with output in a second clock domain of the test circuit so that data arrives in an early clock domain at the desired logical clock cycle.

21. The system of claim 20 wherein the edge calibration circuit includes a one-shot circuit to convert the drive clock signal into a two-cycle wide pulse for comparison with the receive clock signal.

22. The system of claim 20 wherein the edge calibration circuit includes a priority encoder circuit to block output from the sampling circuit after the drive clock signal is compared with the receive clock signal.

23. The system of claim 20 wherein the edge calibration circuit includes a hold calibration circuit.

24. The system of claim 20 wherein the edge calibration circuit issues a bypass signal to the data path if the leading edge of the drive clock signal arrives at least halfway through a first pulse of the receive clock signal.

25. The system of claim 20 wherein the edge calibration circuit issues a bypass signal to the data path if the leading edge of the drive clock signal is aligned with the falling edge of the receive clock signal.

26. The system of claim 20 wherein the receive clock signal includes a plurality of clock calibration signals Is for comparing the drive clock signal and receive clock signal.

27. The system of claim 20 wherein the data path aligns a trigger-in signal with a predetermined pulse in the receive clock signal based at least in part on the select clock signal.

28. The system of claim 20 wherein the select clock signal includes a margin of error for temperature effects.

* * * * *

UNITED STATES PATENT AND TRADEMARK OFFICE
CERTIFICATE OF CORRECTION

PATENT NO. : 7,558,317 B2  Page 1 of 1
APPLICATION NO. : 11/118740
DATED : July 7, 2009
INVENTOR(S) : Timothy C. Fischer et al.

It is certified that error appears in the above-identified patent and that said Letters Patent is hereby corrected as shown below:

On the Title Page, Item (57), under "Abstract", line 5, after "based", delete "a" and insert -- at --, therefor.

In column 4, line 37, delete ".Also" and insert -- so --, therefor.

In column 4, line 38, after "for the", insert -- circuit. --.

In column 8, line 16, in Claim 1, delete "signal," and insert -- signal; --, therefor.

In column 8, line 43, in Claim 5, after "circuit" insert -- . --.

In column 8, line 46, in Claim 7, after "system" insert -- of --.

In column 8, line 49, in Claim 7, delete "dock" and insert -- clock --, therefor.

In column 8, line 51, in Claim 8, delete "competing" and insert -- comparing --, therefor.

In column 9, line 35, in Claim 20, delete "comprising;" and insert -- comprising: --, therefor.

In column 10, line 32, in Claim 26, after "signals" delete "Is".

Signed and Sealed this

Seventeenth Day of November, 2009

David J. Kappos
*Director of the United States Patent and Trademark Office*